United States Patent [19]

Marchione et al.

[11] Patent Number: 4,733,158

[45] Date of Patent: Mar. 22, 1988

[54] CONTROL CIRCUIT FOR TAP-SWITCHING POWER SUPPLIES AND MULTI-TAP TRANSFORMERS

[75] Inventors: Vito J. Marchione, Panorama City; James W. Brunelle, Granada Hills, both of Calif.

[73] Assignee: Datametrics Corporation, Chatsworth, Calif.

[21] Appl. No.: 898,713

[22] Filed: Aug. 21, 1986

[51] Int. Cl.$^4$ .............................................. G05F 1/16
[52] U.S. Cl. .................................... 323/258; 323/343; 363/89
[58] Field of Search ............... 323/255, 258, 301, 340, 323/343; 363/86, 89

[56] References Cited

U.S. PATENT DOCUMENTS

| 3,319,153 | 5/1967 | Livingston | 323/258 |
| 3,743,921 | 7/1973 | Legg et al. | 323/258 |
| 4,454,466 | 6/1984 | Ritter | 323/258 |

FOREIGN PATENT DOCUMENTS

| 1248783 | 8/1967 | Fed. Rep. of Germany | 323/258 |
| 0072223 | 5/1980 | Japan | 363/89 |
| 0805279 | 2/1981 | U.S.S.R. | 363/89 |

OTHER PUBLICATIONS

Barshay et al., "Bifunctional Single-Channel Circuit", IBM Technical Disclosure Bulletin, vol. 14, No. 9, Feb. 1972, pp. 2546-2547.

*Primary Examiner*—Peter S. Wong
*Attorney, Agent, or Firm*—Marvin H. Kleinberg; Matthew F. Jodziewicz

[57] ABSTRACT

A tap-switching circuit for automatically controlling the output voltage of a multi-tap transformer in response to a varying input line voltage and/or system load current demand, includes voltage sensing circuitry in parallel with both the transformer voltage outputs and a voltage comparator for sensing changes in the system load demand requirements. A voltage reference is provided for automatically generating a pre-selected voltage reference level signal for the line and/or system load requirements. Voltage comparison circuitry is operatively connected with the voltage sensing circuitry for generating an enable signal whenever the input line voltage and/or system load current demand requirements sensed by the voltage sensing circuitry falls below the pre-selected voltage reference level signal. A switching circuit is operatively connected to the voltage comparison circuitry, a linear regulator and to at least two taps of the multi-tap transformer for connecting the higher voltage tap to supply a pre-regulator voltage to the linear regulator whenever the enable signal is present, and for disconnecting the higher voltage tap from supplying its pre-regulator output voltage whenever the enable signal is absent.

12 Claims, 1 Drawing Figure

CONTROL CIRCUIT FOR TAP-SWITCHING POWER SUPPLIES AND MULTI-TAP TRANSFORMERS

BACKGROUND OF THE INVENTION

1. Field of the Invention

This invention relates in general to a linear power supply control circuit that operates (changes preregulator voltage) in response to changing input line or system load requirements, and, more particularly, to a control circuit which automatically switches a multi-tap transformer from one tap to another to supply needed currents and voltages within a preregulated voltage range in response to varying input line voltage and/or system load current and voltage demand requirements.

2. Description of the Related Art

The present invention finds immediate application in such an area as thermal printer power supplies.

Thermal printers usually print dot-matrix characters a line at a time across an entire page. In general, printing of the characters (usually in an n×m dot matrix) is accomplished by scrolling a sheet of paper under a printing bar having a plurality of heating elements. A character generator controls the individual heating elements selectively turning them on and off to form the desired characters a line at a time by thermal interaction with the scrolling paper. As is readily seen, in printing an ordinary page the current demands of the printing bar will vary depending on whether a blank line is being printed, requiring no printing elements and little to no current, to a solid underline, requiring all of the printing elements and the greatest current demand.

As printing (scrolling) speeds increase, the printer power supply must be able to quickly respond to the widely varying current demands of the printing bar. For a thermal power supply then to be efficient, it must provide only the minimum required power demanded by the system at any one time.

The present invention improves and differs from the known prior art as outlined below.

U.S. Pat. No. 4,090,234 to Goodman discloses a circuit for controlling a transformer secondary having a plurality of taps responsive to wide variations in input voltage.

U.S. Pat. No. 3,921,059 to Birman provides an automatically regulated power supply operated with a precision series regulator over a pre-determined range of output voltages or currents. This regulated range of voltages and currents is added to relatively large steps of unregulated voltage to provide an over all range of voltages and currents several times the pre-determined range.

U.S. Pat. No. 3,725,771 to Gilmore provides a control for a step voltage regulator having a reversible motor for actuating a tap changer switch to vary the reguator output voltage whenever a "raise" or a "lower" signal is applied thereto.

U.S. Pat. No. 3,418,563 to Grosu provides a single-phase transformer having a switch for selectively connecting the secondary winding of the transformer and pre-selected pairs of winding taps to the outlet circuit of the transformer.

U.S. Pat. No. 3,217,230 to Hart discloses a voltage make-up regulator. The heart of this regulator is a make-up circuit employing a center tapped auto-transformer. A voltage to be controlled is applied to the center tap of the transformer and, through diodes spaced equally on opposite sides of the center tap, to a load circuit through a smoothing filter. Alternate switching pulses, the width of which are controlled by the magnitude of the voltage to be made up, are applied to normally open switches connected to opposite ends of the transformer only when the load voltage decreases below the desired value. The alternate closing of the switches results in current flow through alternate halves of the transformer winding and thus causing a voltage to be induced in the opposite half of the winding. This induced voltage is combined with the source voltage and results in the voltage applied to the load circuit being maintained at its previous level even though the source voltage decreases.

U.S. Pat. No. 4,531,134 to Horlander discloses a number of electrodes which are driven by an operational amplifier under control of a reference current source. The output of the operational amplifier and the magnitude of each of a number of resistors is selected so that the nominal voltage on a line is reduced by one-half across each of the resistors. This approximates a constant power output to a ribbon. The voltage regulation and constant power output each act to limit power dissipation at the ribbon surface, thus reducing debris at the printhead.

The present invention not only improves on the known prior art as outlined above, but also provides a device that can have a small, highly compact power supply with a simple instead of complex control circuit. These latter attributes are essential in allowing thermal printers, desirable for their low noise operation, to be used in areas having limited space, such as aircraft cockpits that also require highly power efficient devices.

SUMMARY OF THE INVENTION

In general, a preferred embodiment of the invention disclosed herein automatically controls the preregulator voltage to a linear regulator by selecting the appropriate tap from a multi-tap transformer in response to a varying input line voltage and/or system load current demand. The circuit includes voltage sensing means being in parallel with both the transformer voltage output and a system load for sensing changes in the system load current demand requirements.

A voltage reference means which automatically generates a pre-selected voltage reference level signal for the voltage comparison means is provided. A voltage comparison means, operatively connected with the voltage sensing means, generates an enable signal whenever the input line voltage or system load current demand requirements, as sensed by the voltage sensing means, falls below the pre-selected voltage reference level signal.

An energy storage means (capacitor) is operatively connected in parallel to the lowest voltage tap and the center tap of a multi-tap transformer and in parallel with the voltage sensing means.

A linear requlation means is operatively connected on its input side to the energy storage means, the switching device means, the voltage sensing means and the lowest tap of the multi-tap transformer. The linear regulation means is operatively connected on its output side to the system load.

Switching means is operatively connected to the voltage comparison means, the capacitor, and two taps of the multi-tap transformer. The second highest voltage tap from the center tap will supply preregulation voltage to the linear regulation means whenever the enable signal is present. Whenever the enable signal is absent, the second highest voltage tap from the center tap is disconnected.

The control circuit may also be used to switch any number of multiple taps on and off of the capacitor in response to varying input line voltage and/or system load current variations in much the same manner as described here for switching the power supply taps between only two taps of a multi-tap transformer.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

Figure 1:
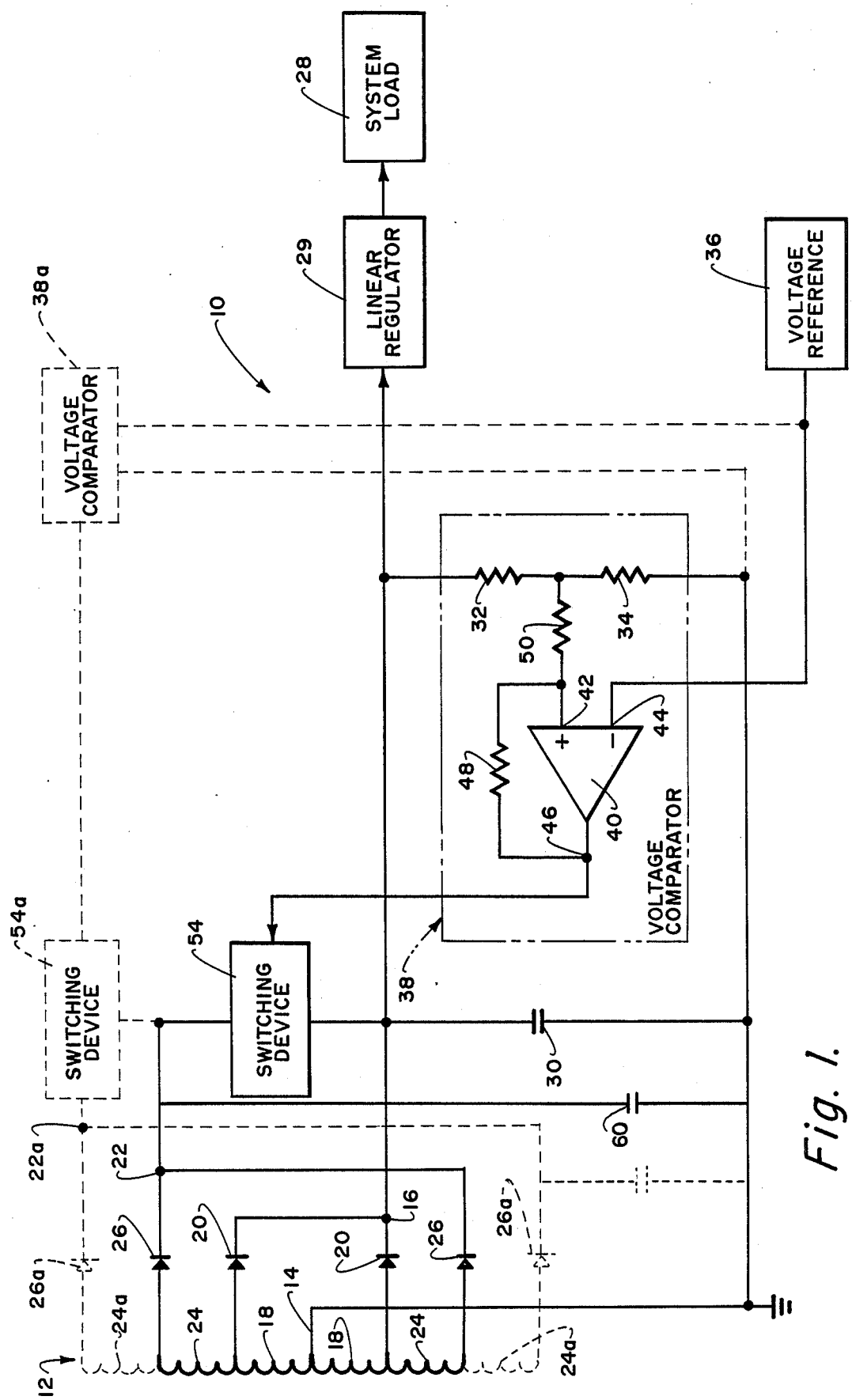
FIG. 1 is a partial block and schematic diagram which broadly sets forth the present invention.

FIG. 1 discloses a block diagram which broadly sets forth circuitry and logic for automatically selecting from among a plurality of taps of a multi-tap transformer to supply needed voltages and currents within a pre-regulated voltage range in response to varying input line voltage and/or system load current requirements.

Referring to FIG. 1, a tap switching circuit 10 constructed in accordance with a preferred embodiment of the present invention, is illustrated in partial block and schematic form. Circuit 10 includes a multi-tap transformer 12 having on its secondary side a center tap 14, a first tap 16 having a first pair of windings 18 and a first pair of rectifying diodes 20, each diode 20 being electrically connected to one of the first pair of windings 18. Transformer 12 also has a second tap 22 with a second pair of windings 24 and a second pair of rectifying diodes 26, each diode 26 being electrically connected to one of the second pair of windings 24. Windings 18 and 24 are electrically connected to each other in series.

Voltage sensing means in parallel with the voltage output of transformer 12 (known as the preregulator voltage) and a linear regulator means 29 for sensing changes in the input line voltage and/or system load current demands comprise a capacitor 30 and a voltage divider network formed by resistors 32 and 34.

Voltage reference means for automatically generating a pre-selected voltage reference level signal are provided by circuitry generally indicated by reference numeral 36.

Voltage comparison means, operatively connected with the voltage sensing means for generating an enable signal whenever the input line voltage and/or system load current demand requirements sensed by the voltage sensing means fall below the voltage reference level signal, are provided by a voltage comparator 38.

Voltage comparator 38 includes a differential amplifier 40 having positive input 42, negative input 44 and an output 46. A feedback network is provided by hysteresis resistors 48 and 50.

Reference voltage source 36 is electrically connected to negative input 44 of differential amplifier 40.

Voltage comparator 38 senses the voltage across capacitor 30 and compares the sensed voltage to a reference voltage from reference voltage source 36. The sensed voltage is altered by hysteresis resistors 48 and 50 to a comparison voltage at input 42 dependent upon the state of the output 46. When the sensed voltage across capacitor 30 falls below a pre-determined voltage reference level as a result of either a load increase and/or a line decrease, the normally high output 46 of voltage comparator circuit 38 goes low, acting as an enable signal for a switching means 54, and, lowers the effective voltage at the positive input 42 of the differential amplifier 40.

In a preferred embodiment, switching means 54 is a semiconductor device capable of acting as a switching device, such as, a MOSFET, transistor, or thyristor. It should also be noted that a mechanical switching device, such as a relay, can also be used, but for greater efficiency, semiconductor switching devices are preferred.

Switching means 54 electrically connects second tap 22 of multi-tap transformer 12 to the linear regulator 29 and capacitor 30. When the output 46 of voltage comparator 38 goes low, as sensed by the voltage sensing circuitry across capacitor 30, it turns on switching means 54 so that the first and second pairs of windings, 18 and 24 respectively, are electrically connected to the linear regulator 29. When both sets of windings, 18 and 24, are connected to provide a pre-regulation voltage to the linear regulator 29, the higher pre-regulation voltage provided by the switched-in tap (here 22) as similarly sensed by the voltage sensing circuitry across capacitor 60, will back bias diodes 20, thereby effectively cutting off the original lower voltage tap 16 until the back biasing higher voltage provided by higher voltage tap 22 is shut off by switching means 54. Thus, lower voltage tap 16 is both shut off when the higher voltage tap 22 is switched into the circuit and automatically reinstated to provide power when higher voltage tap 22 is cut off.

Voltage comparator 38 includes setting up differential amplifier 40 in a hysteresis configuration containing a feedback circuit using resistors 48 and 50. Under normal line and load conditions switching means 54 is in the "off" state and the voltage sensed across capacitor 30 is derived through windings 18 of transformer 12. When the voltage sensed across capacitor 30 changes, due to either an increased load and/or a decreased line demand, the sensed voltage input to voltage comparator 38 is lower than the reference level voltage provided by voltage reference circuitry 36. When this occurs, voltage comparator 38 will change its output state. Thus, voltage comparator 38 generates an enable signal which directs switching means 54 to switch into its "on" state connecting the second pair of windings 24 to the capacitor 30 and thus increase the pre-regulator voltage to the linear regulator 29. The increased pre-regulator voltage allows the linear regulator to provide the proper power demanded by the system load 28. At the same time, due to the hysterisis configuration providing a feed back signal to the voltage comparator circuit 38 through resistors 48 and 50, the sensed voltage trip point for changing the voltage comparator circuit 38 output also changes. Switching means 54 will remain in the "on" state until the load current decreases and/or the input line voltage increases, at which time switching means 54 will turn off and the sensed voltage trip point will return its initial condition.

The preceeding description of circuit 10 shows that when the tap-switching means 54 is in the "OFF" condition and the voltage source for the regulator 29 is from the pre-regulator voltage appearing across capacitor 30, the capacitor 60 is charged to its full potential and continues to be charged through diodes 26. Fully charged capacitor 60 remains unloaded at all times, until the tap-switching means 54 is turned "ON". When the tap-switching means 54 is turned "ON", capacitor 60 discharges its stored energy into capacitor 30, thereby raising the pre-regulator voltage being supplied to the regulator 29. It should also be noted that this tap switching can be triggered at any time in relation to the phase angle of the input voltage, and is totally independent of the phase angle of the input voltage. Also, it should be noted that the voltage appearing across the parallel combination of capacitors 30 and 60 after the tap switching has occurred, is a function of the energy that is stored in each of the two capacitors 30 and 60 just prior to the tap switch occurring. In other words, if the two capacitors 30 and 60 are of equal value, then the resultant voltage will be half-way between the two potentials being stored in each of the capacitors 30 and 60 just prior to the tap switching.

FIG. 1 also illustrates how circuit 10 described above can be expanded to include a plurality of switching means 54a and varying tap voltage outputs 22a all automatically controlled in a like manner to that described for a single switching means 54 and voltage comparator means 38. Reference numbers having a letter refer to similar components and devices as described and referenced in FIG. 1 without the letter.

The invention described above is, of course, susceptible to many variations, modifications and changes, all of which are within the scope of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

We claim:

1. A control circuit for automatically controlling the output voltage of a multi-tap transformer in response to a varying input line voltage and/or system load current demands, the control circuit comprising:
    voltage sensing means being in parallel with the transformer voltage output and a linear regulator for sensing changes in the line or system load current demand requirements:
    voltage reference means for automatically generating a pre-selected voltage reference level signal for the line or system load current demand requirements;
    voltage comparison means operatively connected with said voltage sensing means for generating an enable signal whenever the line or system load current demand requirements sensed by said voltage sensing means falls below said voltage reference level signal;
    switching means operatively connected to said voltage comparison means, said linear regulator and across a high tap and a low tap of the multi-tap transformer for connecting said high tap to supply a preregulator voltage to said linear regulator for the system load whenever said enable signal is present and for disconnecting said high tap from supplying said preregulator voltage whenever said enable signal is absent.

2. The control circuit as in claim 1 wherein said switching means is a thyristor.
3. The control circuit as in claim 1 wherein said switching means is a transistor device.
4. The control circuit as in claim 1 wherein said switching means is a MOSFET device.
5. The control circuit as in claim 1 wherein said switching means is a mechanical relay.
6. The control circuit as in claim 1 wherein said voltage sensing means is a capacitor electrically associated with a voltage divider network.
7. The control circuit as in claim 1 wherein said voltage comparison means comprises a differential amplifier.
8. A tap-switching circuit for use in conjunction with a multi-tap transformer which includes on its secondary side a center tap, a first tap having a first pair of windings and a first pair of rectifying diodes each of which is electrically coupled to one of the first pair of windings and a second tap having a second pair of windings and a second pair of rectifying diodes each of which is electrically coupled to one of the second pair of windings, said tap-switching circuit comprising:
    a capacitor having a first plate and a second plate, said first plate being electrically coupled to the first tap of the multi-tap transformer and said second plate being electrically coupled to the center tap of the multi-tap transformer;
    comparing means for sensing and comparing the voltage of said first plate of said capacitor to a reference voltage when the sensed voltage at said first plate of said capacitor goes below a predetermined voltage level as a result of either load increase or line decrease, said comparing means having an output, normally high, which goes low when the sensed voltage at said first plate of said capacitor goes below said predetermined voltage level;
    switching means connected to said comparing means for electrically coupling the second tap of the multi-tap transformer to said first plate of said capacitor, when said comparing means output goes low it turns on said switching means so that both the first and second pairs of windings are electrically coupled to said first plate of said capacitor.

9. A tap-switching circuit for use in conjunction with a multi-tap transformer according to claim 8 wherein said comparing means comprises:
    an amplifier having a positive input, a negative input and an output which is electrically coupled to said positive input by a first resistor and to said switching means;
    a second resistor which is electrically coupled to said positive input to said amplifier, and to said first resistor and to said voltage divider:
    a third resistor which electrically couples said second resistor to said second plate of said capacitor;
    a fourth resistor which electrically couples said second resistor to said first plate of said capacitor; and
    a reference voltage source which is electrically coupled to said negative input.

10. A tap-switching circuit for use in conjunction with a multi-tap transformer according to claim 8 wherein said switching means is a field effect transistor having a drain which is electrically coupled to the second tap, a source which is electrically coupled to said first plate of said capacitor and to the first tap, and a base which is electrically coupled to said output of said voltage comparator.

11. A tap-switching circuit for use in conjunction with a multi-tap transformer according to claim 8 wherein said switching means is a transistor or any other electronic switching device having an emitter which is electrically coupled to said second tap, a collector which is electrically coupled to said first plate of said capacitor and to the first tap and a base which is electrically coupled to said output of said voltage comparator.

12. A tap-switching circuit for use in conjunction with a multi-tap transformer which includes on its secondary side a center tap, a first tap having a pair of windings and a pair of rectifying diodes each of which is electrically coupled to one of the pair of windings and a plurality of multiple taps each of which has a pair of windings and a pair of rectifying diodes each of which is electrically coupled, respectively, to one of the pair of windings, said tap-switching circuit comprising:

a capacitor having a first plate and a second plate, said first plate being electrically coupled to the first tap of the multi-tap transformer and said second plate being electrically coupled to the center tap of the transformer;

a plurality of comparing means for sensing and comparing the voltage at said first plate of said capacitor to a reference voltage, to determine when the sensed voltage at said first plate of said capacitor goes below a predetermined voltage level as a result of either load increase and/or line decrease, each of said plurality of comparing means having an output, normally high, which goes low when the sensed voltage at said first plate of said capacitor goes below said predetermined voltage level;

a first plurality of switching means for electrically coupling the plurality of multiple taps of the transformer to said first plate of said capacitor, said comparing means, when its output goes low, turning on said switching means so that both the first and subsequent pairs of windings are electrically coupled to said first plate of said capacitor.

* * * * *